US012659409B2

(12) United States Patent
Bendiabdallah et al.

(10) Patent No.: US 12,659,409 B2
(45) Date of Patent: Jun. 16, 2026

(54) CALL TRANSFERRING BY DETECTING THE PRESENCE OF A TERMINAL IN A LOCAL NETWORK

(71) Applicant: Orange, Issy-les-Moulineaux (FR)

(72) Inventors: Halim Bendiabdallah, Chatillon (FR); Yves Quinson, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/342,645

(22) Filed: Jun. 27, 2023

(65) Prior Publication Data

US 2023/0421697 A1     Dec. 28, 2023

(30) Foreign Application Priority Data

Jun. 28, 2022     (FR) ...................................... 2206474

(51) Int. Cl.
*H04M 3/54*          (2006.01)
*H04M 7/12*          (2006.01)

(52) U.S. Cl.
CPC ........... *H04M 3/54* (2013.01); *H04M 7/1285* (2013.01)

(58) Field of Classification Search
None
See application file for complete search history.

(56) References Cited

U.S. PATENT DOCUMENTS

| | | | | |
|---|---|---|---|---|
| 2003/0231754 A1* | 12/2003 | Stein | ................... | H04M 1/2745 |
| | | | | 379/211.02 |
| 2005/0075109 A1* | 4/2005 | Neyret | ................... | H04M 3/54 |
| | | | | 455/445 |
| 2009/0180604 A1* | 7/2009 | Koch | ..................... | H04M 3/54 |
| | | | | 379/211.02 |
| 2013/0023254 A1 | 1/2013 | Ricci | | |
| 2013/0113928 A1* | 5/2013 | Feldman | .................. | G08B 3/10 |
| | | | | 340/687 |
| 2022/0224794 A1* | 7/2022 | Auffret | ............. | H04M 3/42263 |

FOREIGN PATENT DOCUMENTS

| | | | | |
|---|---|---|---|---|
| JP | 2007 124170 A | 5/2007 | | |
| WO | WO-2020234246 A1 * | 11/2020 | ........ | H04M 3/42263 |

OTHER PUBLICATIONS

Hitachi Ltd, English Translation of JP2007124170 (Year: 2007).*
French Search Report for French Application No. 2206474 dated Jan. 26, 2023.
French Written Opinion for French Application No. 2206474 dated Jan. 27, 2023.

* cited by examiner

*Primary Examiner* — Antim G Shah
(74) *Attorney, Agent, or Firm* — Knobbe, Martens, Olson & Bear, LLP

(57)          ABSTRACT
A method of redirecting of an incoming call received over a telephone line connected to a gateway. The gateway manages a local network and determines, for a terminal present in the local network, if a call number is associated with an identifier of the terminal in view of redirecting the incoming call to the terminal from the call number.

13 Claims, 4 Drawing Sheets

CALL TRANSFERRING BY DETECTING THE PRESENCE OF A TERMINAL IN A LOCAL NETWORK

CROSS-REFERENCE TO RELATED APPLICATIONS

This application claims foreign priority to French Patent Application No. FR 2206474, entitled "CALL TRANSFER-RING BY DETECTING THE PRESENCE OF A TERMI-NAL IN A LOCAL NETWORK" and filed Jun. 28, 2022, the content of which is incorporated by reference in its entirety.

BACKGROUND

Technical Field

The present disclosure relates to technologies imple-mented by gateways between a wide area network and a local network, such as Internet access, wifi networks, tele-phone networks, mobile applications and computer security.

Prior Art

The present disclosure applies to different use cases, but to properly understand the disclosure, the case of an inter-com with a radio access module to a cellular network is taken as an example below.

A first type of wire-based intercom is known. Pressing a button that points to a particular home initiates a call to a receiver that connects the caller with the recipient. The recipient may then activate a button that allows him to open the door remotely.

The installation of this type of intercom remains costly as the intercom must be electrically connected by wire to the receiver, thus the intercom and the receiver are wired to each other via a cable sheath that is generally copper.

More recently, a second type of intercom has been pro-posed. To prevent cabling, the intercom is equipped with a radio access module to a cellular network or "cellular modem" (GSM, 3G, 4G, or other) with a security module, such as an integrated SIM card, in order to initiate a call to a pre-recorded telephone number (to a fixed or mobile telephone). Thus, one must first declare a list of telephone numbers that are successively called if the first telephones in the list do not answer the call.

However, the following disadvantages are observed:

if the user of the first telephone number in the list is not in the home, he is called anyway;

if the first telephone number is that of a fixed telephone line in the home, connected to an answering machine, and no one is present or takes the call, no other telephone in the list is notified of the ring;

the sequence of calls may be long in the event where a person present in the home who takes the call is at the end of the list;

there may be accidental circumstances where a person, away from the home and whose terminal number is at the top of the list, takes the call: the terminal of a person present in the home but whose number is at the end of the list is not notified and thus cannot effectively open the access that the intercom controls.

SUMMARY

The present disclosure aims to improve the situation.

A method is proposed of redirecting an incoming call to a telephone number associated with a gateway. This gateway manages a local network. The method may thus comprise: determining for a terminal present in the local network if a call number is associated with an identifier of the terminal in view of redirecting the incoming call to said call number.

The gateway may be for example a home gateway (or "box") installed in a home, for example an intercom of the aforementioned type may be disposed at the entrance of this home and may initiate the incoming call.

The aforementioned local network may be, for example, a short-range radio frequency network, for example of the wifi type. Thus, the gateway may identify the terminals present in the local network, and thus in the aforementioned home, and may organize the redirection of the incoming call if at least one of these terminals is present in the local network, firstly, and identified as capable of receiving the call, secondly.

Determination of the terminal to which the call is redi-rected may be carried out by consulting a memory listing the identifier of the terminal (for example an address of this terminal in the local network) corresponding to a call number (an MSISDN number, for example).

The call number associated with the gateway may be, for example, a telephone line to which a fixed telephone linked to the gateway is connected. In a variation, the gateway may be connected to the cellular network (4G or 5G) but not necessarily to a fixed line, such an embodiment not changing the method.

In one embodiment where the local network is a wireless network, the gateway may obtain the identifier or identifiers of terminals present in the local network, during the con-nection of this terminal or these terminals to the wireless network.

Thus, the gateway obtains the identifiers of equipment or terminals connected to the local network, for example the addresses of this equipment in the local network, and deduces the identifiers of terminals that are capable of, first, taking the incoming call and that are, second, present in the network and thus within a coverage zone of the local network.

In fact, the identifiers of terminals capable of taking the incoming call (and not all the equipment connected to the local network) can be listed beforehand in a memory, corresponding to the call numbers. This may be the call number of this terminal. This may also be a call number of another terminal. The terminal may be a connected object, associated with this other terminal capable of taking a telephone call. When this connected object is present in the local network, the call is transmitted to the terminal asso-ciated with this object. Thus, for example for a visitor to the home to which this connected object is assigned, the calls are forwarded to the mobile terminal of this visitor without his terminal having access to the local network.

In an example of embodiment, the gateway may transmit the identifier of the terminal present to at least one call redirection server, with a number of a terminal initiating the incoming call, for putting the terminal initiating the incom-ing call in communication with the call number associated with a terminal present in the local network.

Thus, in such an embodiment, the call redirection server may consult the aforementioned memory and deduce the identifier of the terminal receiving the call number associ-ated with this terminal.

Alternatively to the use of a call redirection server, the gateway may consult the aforementioned memory and itself redirect the call to the terminal present, particularly if this terminal is configured to pass/receive telephone calls via the gateway (for example in wifi connection).

In an embodiment where a plurality of terminals are listed as being associated with a gateway with a call redirection order of priority assigned to each terminal, if at least two terminals are present in the local network and listed, the call may be redirected to the highest-priority terminal, and in the event of a non-response from the highest-priority terminal, the call may then be redirected to the terminal with a lower priority than the highest priority.

Thus, several terminals may be identified (@SMk, @SMj, @OBC) in the aforementioned memory (see, for example the memory referenced MEM3 in FIG. 1 described in detail below), corresponding with a call number (#SMk, #SMj, #SMn), and classified in a decreasing order of priority. These priorities may be chosen for example by a user, for example during a configuration of equipment contributing to this call redirection (gateway and/or redirection server).

In one example of embodiment, the gateway may determine the number of the terminal initiating the incoming call, and the redirection of the incoming call is activated if the number of the terminal initiating the incoming call corresponds to at least one first terminal number.

For example, this first terminal number may be stored in a memory which the gateway accesses (bearing reference MEM2) in FIG. 1.

Thus, the gateway may store this first number in memory and transmit the identifier of the terminal present to the call redirection server if the number of the terminal initiating the incoming call corresponds to the aforementioned first number.

For example, this first terminal number may be an intercom number.

Indeed, as indicated above, an intercom may be equipped with a radio access module to a cellular network and a security module, for example a SIM ("Subscriber Identification Module") card and may be programmed to call the telephone line which is connected to the gateway.

Alternatively, the gateway may determine at least one prefix of the number of the terminal initiating the incoming call, and the redirection of the incoming call is activated if this prefix corresponds to the at least one first prefix.

For example, this first prefix may be that of a mobile terminal (of the +33-6 or +33-7 type for example in France). Such an embodiment enables a user of a mobile terminal, found for example near the home of the gateway and calling the telephone line of this home, to thus determine if at least one user is present in the home to take the call.

According to another aspect, a computer program comprising instructions for the implementation of all or part of a method as defined in the presents when this program is executed by a processor is proposed. According to another aspect, a non-transitory computer-readable recording medium, on which such a program is recorded, is proposed.

According to another aspect, a gateway configured for the implementation of the method according to the presents is proposed.

Such a gateway may thus be configured to manage a wireless local network and determine the identifier or identifiers of terminals present in the local network. The gateway may also be configured to transmit this or these identifier(s) of the terminals present to at least one call redirection server, with a number of the terminal initiating the incoming call, for putting the terminal initiating the incoming call in communication with at least one call number associated with one of the terminals present in the local network.

According to another aspect, such a call redirection server is proposed, configured to: receive from the gateway the number of the terminal initiating the incoming call as well as the identifier of the terminal present in the local network, determine a call number associated with a terminal present from the identifier of this terminal present, and put the terminal initiating the incoming call in communication with the call number.

BRIEF DESCRIPTION OF THE DRAWINGS

Other features, details and advantages will appear upon reading the detailed description below, and analyzing the attached drawings, wherein.

DETAILED DESCRIPTION OF CERTAIN ILLUSTRATIVE EMBODIMENTS

Figure 1:
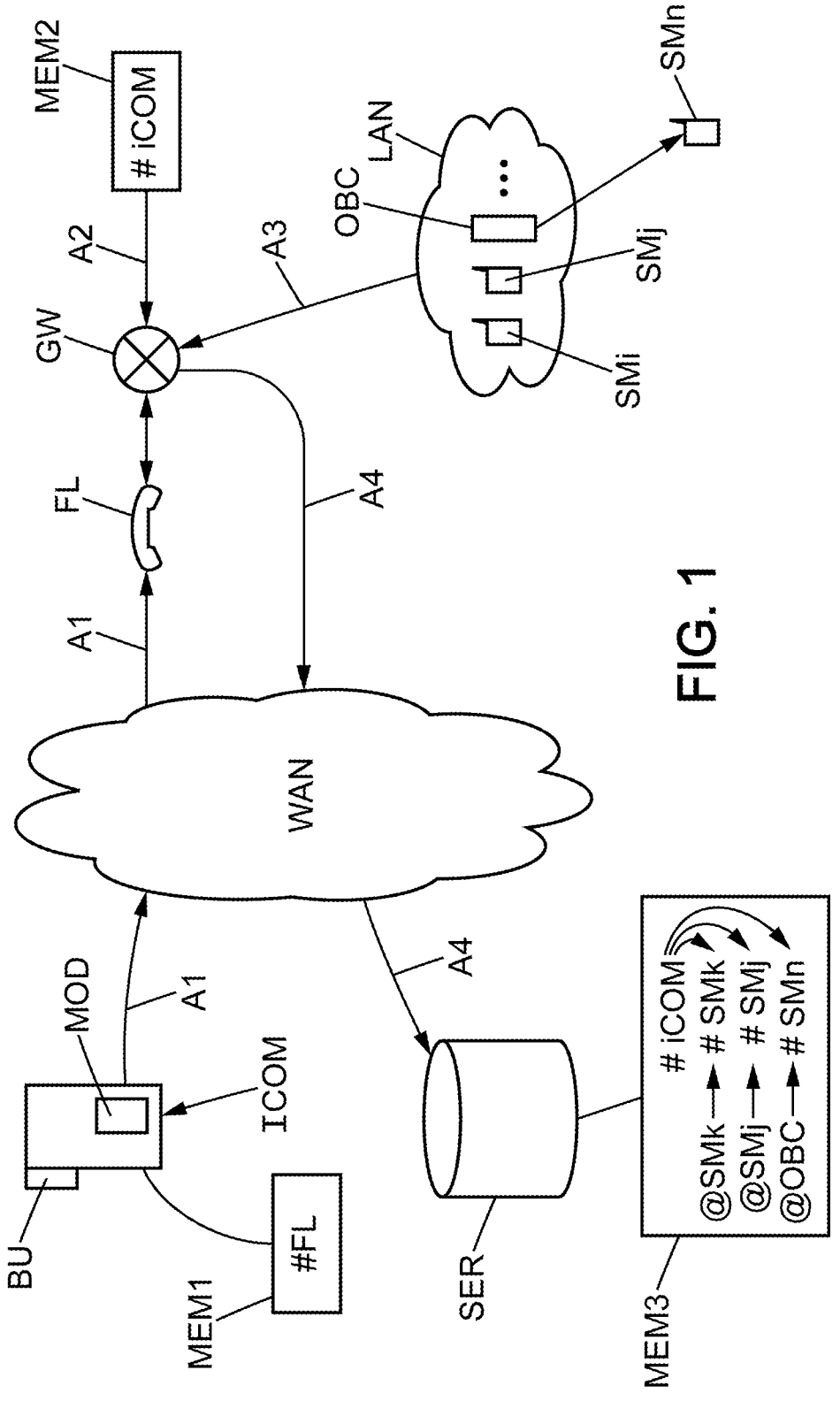
FIG. 1 shows an example of a system for implementing a method defined above and comprising, for example, equipment such as a gateway and a server, as defined above.

FIG. 1 presents an example of embodiment in which the incoming call (arrow A1) is issued from an intercom ICOM disposing a radio access module to a cellular network (modem) MOD equipped with a security module, such as a SIM card. This call is typically made by a user pressing on a call button BU that the intercom ICOM comprises. For example, the intercom ICOM has access to a memory MEM1 storing a call number of a telephone FL such that the modem MOD calls the number of this telephone FL.

This telephone FL is connected, in particular, to a gateway GW (typically a home gateway between a WAN (for "Wide Area Network") wide network and a LAN (for "Local Area Network") local network. The number of this telephone is associated with the gateway. The local network LAN may comprise a short-range radio frequency network of the wifi type. In particular, the gateway GW manages this local network LAN. Thus, gateway GW is capable of determining the equipment SMi, SMj, etc. connected thereto (arrow A3) and thus present in the home in which the gateway GW is disposed. For example, gateway GW may obtain the identifiers of this equipment, such as the MAC (for "Medium Access Control") addresses of this equipment in the network @SMi, @SMj, etc.

The presence of a terminal in the local network may be detected by the connection of a piece of equipment SMi that is associated with this terminal. In this case, the presence of the terminal in the local network is detected due to the presence of the equipment that is associated with it.

Thus, upon reception of incoming call A1 issued from intercom ICOM, gateway GW consults a memory MEM2 to determine if the number of the terminal that initiates the incoming call (A1) is listed in this memory MEM2. If such is the case, gateway GW recovers the number #ICOM of the terminal initiating the incoming call (arrow A2) and transmits this number with the identifiers of equipment present in the local network SMi, SMj, etc. (arrow A4), to a server SER, via the wide area network WAN.

In this example of embodiment, server SER is a call redirection server that may access a memory MEM3, upon reception of the intercom #ICOM number and the identifiers @SMi, @SMj of equipment present in the local network LAN (arrow A4 at bottom left of FIG. 1). This memory MEM3 may store for example a database that lists:

identifiers of pieces of equipment @SMk, @SMj, @OBC, that have previously been declared by a user of the gateway GW for example as mobile terminals capable of taking a call issued from the intercom ICOM (such as, for example, mobile terminals for adults capable of verifying if the person who rings the intercom can be admitted into the home), or else as connected objects declared in a memory as being associated with mobile terminals capable of taking this call, corresponding respective call numbers of these mobile terminals: #SMk, #SMj, #SMn, etc. which may typically be MSISDN (for "Mobile Station International Sub scriber Directory Number") numbers.

Thus, server SER may be configured to redirect the call initiated by the intercom ICOM first to the first call number associated with terminal SMk if the latter is present in the home (directly detected as connected to the local network or if an associated piece of equipment is connected to the local network) and, if it is not, to redirect the call to the second call number associated with terminal SMj in the list stored in memory MEM3 if the latter is reliably detected as present in the home, etc.

In the example in FIG. 1 terminal SMk is not detected as among the equipment present in the home and the call is then redirected to terminal SMj. Thus, intercom ICOM is connected to terminal SMj. If this terminal SMj does not respond, the call may be redirected to the next terminal SMn in memory MEM3, as long as this terminal SMn (or else a connected object OBC with which this terminal SMn is associated, as illustrated in the example in FIG. 1) is newly detected in the local network LAN.

Thus, if the user of the main mobile terminal SMk is not present in the home, the call is forwarded to the next mobile terminal SMj in the list of memory MEM3, which happens to be present in the home.

In the example from FIG. 1, it may be noted that the equipment SMi, while among the equipment present in the local network, has not been declared in memory MEM3 as being capable of taking a call. This may be a piece of equipment such as a connected printer, a connected or other television, or else a mobile terminal which is capable of taking a call but is in the possession of an unauthorized person, such as a child, for example.

It may also be noted in the example of FIG. 1 that the equipment OBC is one of the pieces of equipment present in the local network and has been declared in memory MEM3 as being associated with a terminal SMn capable of receiving a call. This may be a piece of equipment such as a connected object, the only role of which is to be connected to the local network in order to enable the detection of the presence of a terminal in the coverage zone of the access gateway.

Thus, thanks to this implementation, it is possible to detect the user(s) present in the home who is or are capable of taking the communication with the intercom and thus to redirect the intercom call to a terminal of such a user authorized to take this call.

Of course, such an embodiment assumes that the user(s) of mobile terminals is or are connected in priority to the wifi network, typically when the user is in their home, which is very often the case to prevent data communication use via the cellular network.

In addition, the fixed telephone FL and/or gateway GW may be configured to not allow an answering machine of the fixed telephone to respond when the incoming call is identified as being initiated by the intercom number #ICOM.

Alternatively or in addition to the declaration of a prioritized list to be stored in memory MEM3, it is possible to select in priority the connected equipment having the strongest radio frequency signal with the gateway ("RSSI" for "Received Signal Strength Indication"). Such an embodiment may be advantageous, especially in the case of a home in a residence, the terminal of a user can then be detected while the user is not necessarily in the home itself but is within the coverage zone of the access gateway.

In addition, alternatively to the action of a redirection server SER, the gateway GW may directly access the memory MEM3 (or an equivalent content). In fact, in the event where at least one of the users of terminals SMk, SMj, SMn, has configured its terminal to authorize the reception of calls in wifi, gateway GW may then redirect or reroute the incoming call to this terminal once it has been connected to the wifi network that manages the gateway, directly and without passing through a call redirection server.

In the event where a call redirection server SER is used, the database presenting the intercom numbers #ICOM, corresponding to the MAC or IP addresses of the terminals to be contacted @SMk, etc. and an associated call number #SMk, etc. may be stored in a memory MEM3 integrated with a server or in a memory of a remote server, to which the call redirection server SER is connected.

In addition, alternatively to a content of the memory MEM2 storing an intercom number, some form of prefix of the number of the terminal initiating the incoming call may simply be stored. For example, this prefix may be that of a mobile terminal (for example +33-6 or +33-7 in France). Thus, in such an embodiment, a user of a mobile terminal passing, for example, near the home of a fixed telephone FL user connected to the gateway GW, may attempt to determine if at least one user of the fixed telephone FL is at home and may call this fixed telephone. Gateway GW may then determine (with for example the support of server SER) if at least one mobile terminal SMk, SMj, etc. capable of taking the call is in the home to connect an occupant of the home with the person initiating the call, if the call is from a mobile terminal exclusively. However, if the number of the terminal initiating the incoming call has a prefix different from that of a mobile terminal, then the call may naturally be received by the fixed telephone FL (and then possibly be received by its answering machine). Such an embodiment may then contribute to the screening of calls that may be from ad call platforms and that are not generally initiated by mobile terminals. In addition, when a person has mobile numbers and fixed numbers for a same contact in his contacts and decides to call the fixed number, it may be assumed that this person is attempting to reach any correspondent present in the home of the contact. Adapting the embodiment presented in FIG. 1 by replacing the number #ICOM in memory MEM2 with a simple number prefix (such as a terminal number prefix) enables such a service to be offered. In addition, in the event where the call eventually terminates to an answering machine of the fixed telephone FL, the caller may conclude that nobody is present in the home to take his call.

Figure 2:
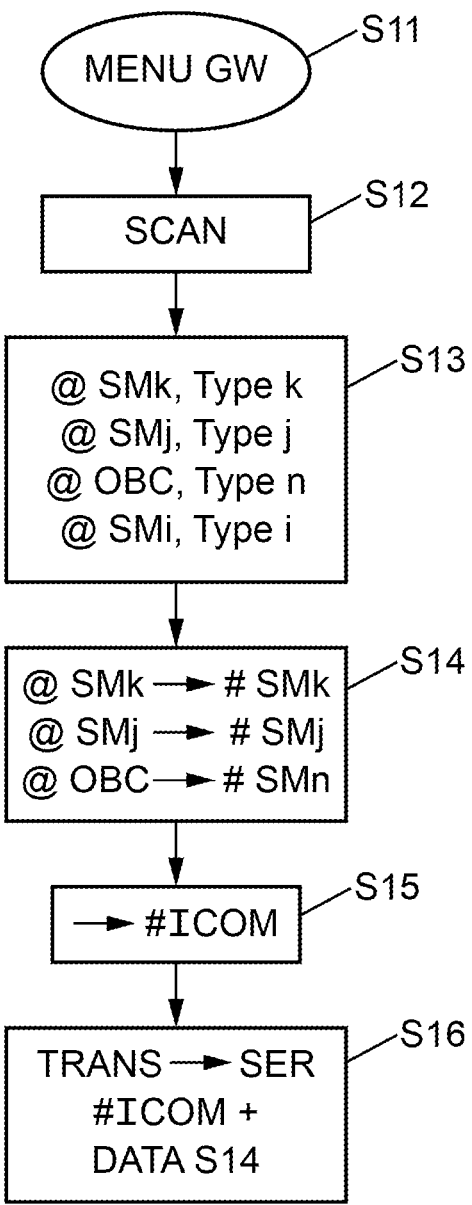
FIG. 2 shows the steps of a configuration phase of such equipment, in an example of the method of the type above.

With reference to FIG. 2, a prior phase of configuring the equipment acting in the implementation of the embodiment presented in FIG. 1 in a particular embodiment is described below.

In step S11, a user may access, with the man-machine interface of one of his terminals connected to gateway GW, a configuration menu of gateway GW. By selecting a specific page of the menu, the user may for example declare to the gateway GW the numbers of mobile terminals to be contacted in the event of the reception of a call from the intercom ICOM. Beforehand, the user connects to the local wifi network LAN all the equipment for which a mobile terminal is capable of receiving the call from the intercom. In step S12, wherein the gateway scans the equipment connected to the wifi network, the gateway GW may identify all the connected equipment. A page may then be displayed on the aforementioned man-machine interface, this page presenting in step S13:

all the MAC addresses of connected equipment @SMk, @SMj, @OBC, @SMi, etc.
corresponding to the type of each piece of connected equipment Type k, Type j, Type n, Type i, etc.

In such a menu, a gateway may generally indicate for each piece of equipment at least the brand, the model and also, for at least some of the mobile terminals, their account identifier (for example "Michel's Iphone®"). Thus, the user may determine at least the type of equipment based on the information given by the gateway.

The user may then enter, in step S14, via the aforementioned man-machine interface, for each MAC address of connected equipment, an associated call number #SMk, #SMj, #SMn, capable of taking a call from the intercom. In step S15, the user also declares the call number of the intercom #ICOM. The user may also assign to each call number the respective call transfer priorities of calls from the intercom: for example, first transfer the call to the call number associated with mobile SMk, and then to the call number of mobile SMj if the call number of mobile SMk does not respond, and then to the call number of mobile SMn, etc. The user may also remove the pieces of equipment (for example the equipment SMi). The user may also choose to delete an option consisting of redirecting the incoming call to the fixed telephone FL, if none of the call numbers of declared terminals SMk, SMj, SMn respond to the call, to prevent for example children present in the home from taking the call.

Gateway GW records the call number of intercom #ICOM in its memory MEM2. All of this data (#ICOM and @SMk, @SMj, @OBC corresponding with #SMk, #SMj, #SMn) is then transmitted to the call redirection server SER, in step S16, to be stored therein in memory MEM3.

It is also possible for the user to access the configuration menu of gateway GW to modify a call number associated with a piece of equipment in the local network, for example that associated with @OBC.

Figure 3:
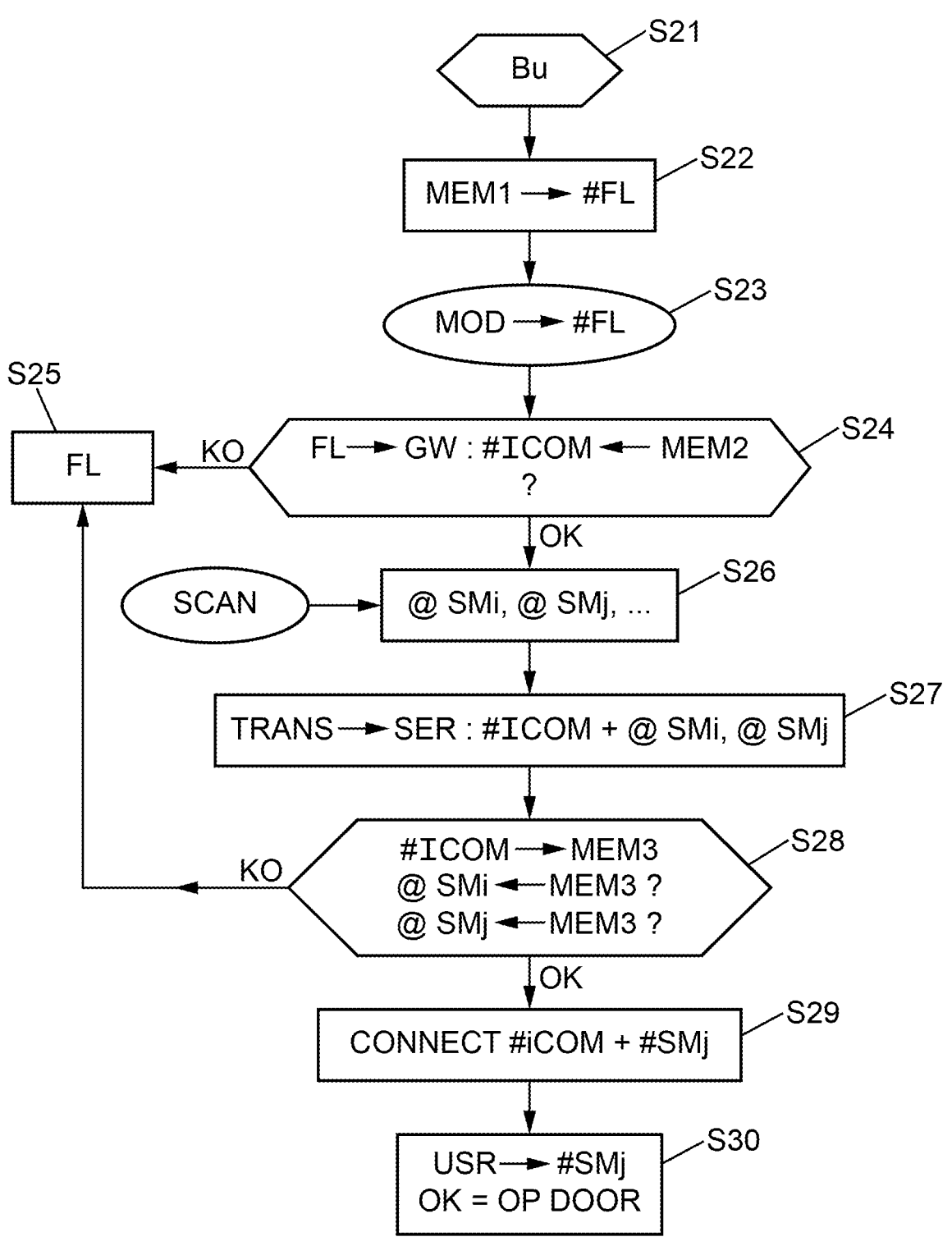
FIG. 3 shows the common steps of an example of the method defined above.

We will now refer to FIG. 3 to describe the common steps implemented in the event of an incoming call issued from the intercom ICOM. In step S21, a user presses the button BU of the intercom, which brings about, in step S22 a memory reading of the number of fixed line FL to which gateway GW is connected (in memory MEM1 of the intercom as illustrated in FIG. 1). The modem MOD of the intercom then calls the number of fixed line #FL in step S23 and, in step S24, the call issued from the intercom is processed by the gateway GW. This gateway GW determines if the incoming call number #ICOM was properly recorded beforehand in memory MEM2, as being the call number of the intercom ICOM.

If this is not the case (arrow KO out of test S24), then the call is taken by the fixed telephone FL connected to gateway GW and possibly directed to an answering machine (step S25).

If this is the case (arrow OK out of test S24), then the gateway:

prevents the call from being directed to the fixed telephone to which it is connected and prevents the answering machine from being activated,
recovers the identifiers of equipment connected to its local network (such as the MAC addresses of these pieces of equipment), in step S26, and
transmits to the call redirection server SER, in step S27, the identifiers of equipment present in the local network @SMi, @SMj, @OBC with the number of the intercom initiating the call #ICOM.

In step S28, server SER reads for example the number of the terminal calling #ICOM and reads in memory MEM3, the identifiers of equipment present in the local network @SMk, @SMj, @OBC. Server SER may thus determine if at least one of the identifiers received from gateway @SMi, @SMj, corresponds to one of these prerecorded identifiers @SMk, @SMj, @OBC (in this case, the identifier @SMj). If this is not the case (arrow KO out of test S28), server SER cannot redirect the call and may transmit a failure message to the gateway that eventually directs or routes the call to the fixed line FL (step 25). However, if this is the case (arrow OK out of test S28), then the call redirection server may put the intercom ICOM in communication with the first terminal SMj:

that responds to the call,
that is present in the local network LAN and
the number (#SMj) of which is listed in memory MEM3 to which server SER has access.

For example, server SER may use the equipment identifier @SMj that it receives from gateway GW, to find, corresponding to this identifier @SMj in memory MEM3, the associated call number #SMj and to use this call number #SMj for putting it in communication with the intercom ICOM, in step S29.

Then, during this communication, the user of the called terminal may use an interface of his terminal to click on a button that enables, for example, an access door to his home to be opened, in the manner of a conventional intercom, in step S30.

Figure 4:
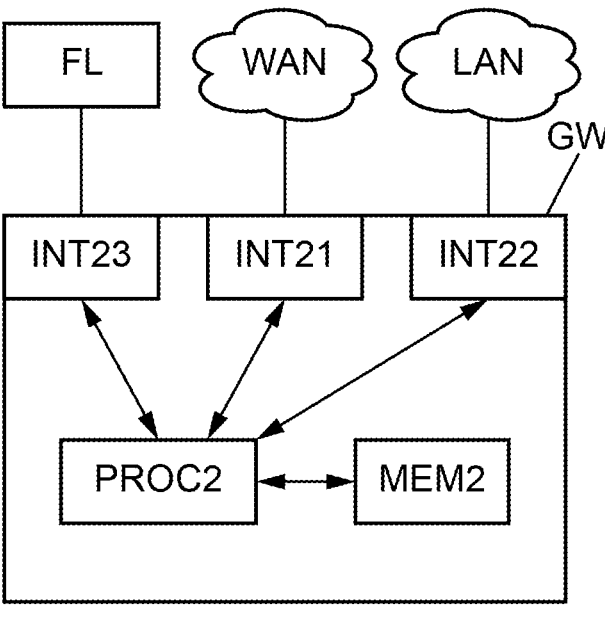
FIG. 4 shows an example of embodiment of a gateway of the type defined above.

By way of example, FIG. 4 illustrates the structure of a gateway GW for the implementation of the above method. Gateway GW may typically comprise:

an interface INT21, for communication with the wide area network WAN, particularly for taking external calls and/or for communicating with server SER,
an interface INT22, for communication with the local network LAN, by radio frequency, typically of the wifi type,
an interface INT23, for communication with a fixed telephone FL connected to the fixed line to which gateway GW is connected (typically via a cable RJ45),
a memory MEM2 storing at least the intercom number #ICOM, as well as the instruction codes of a computer program for the implementation of the method above, and
a processor PROC2 capable of cooperating with memory MEM2 for reading these instructions and executing the aforementioned computer program according to the method above.

Figure 5:
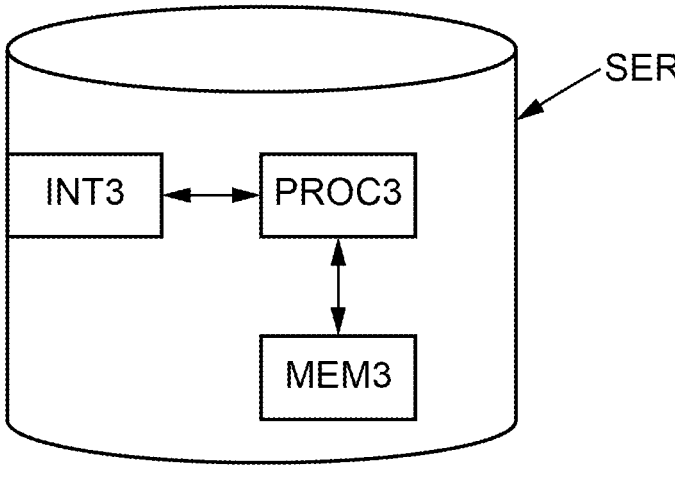
FIG. 5 shows an example of embodiment of a call redirection server of the type defined above.

FIG. 5 illustrates, by way of example, the structure of a call redirection server SER that may typically comprise:

an interface INT3, for communication with the wide area network WAN, particularly for the communication with gateway GW, a memory MEM3 storing at least the data received from the gateway in step S16, as well as the instruction codes of a computer program for the implementation of the method above when the server SER acts in the particular steps of this method, and a processor PROC3 capable of cooperating with memory MEM3 for reading these instructions and executing the aforementioned computer program according to the method presented above.

The invention claimed is:

1. A method of redirecting an incoming call initially directed to a telephone number associated with a gateway, wherein the gateway manages a local network, the method comprising:

determining for a terminal present in the local network if a call number is associated with an identifier of the terminal in the local network to authorize redirecting the incoming call to the call number, wherein the gateway determines the number of a calling terminal initiating the incoming call, and the redirection of the incoming call is triggered when the number of the calling terminal initiating the incoming call is determined as corresponding to a number of an intercom of a place where the gateway operates, and wherein the call number is associated with an identifier of the terminal in the local network only for terminals declared capable of taking a call issued from the intercom.

2. The method according to claim 1, wherein the local network is a wireless network and the gateway obtains the identifier of the terminal present in the local network during connection of the terminal to the wireless network.

3. The method according to claim 1, wherein:

the gateway transmits the identifier of the terminal present to the at least one call redirection server, with a number of the terminal initiating the incoming call, for putting the terminal initiating the incoming call in communication with the call number.

4. The method according to claim 1, wherein, a plurality of terminals being listed as being associated with the gateway with a call redirection order of priority assigned to each terminal, if at least two terminals are present in the local network and are listed, the call is redirected to the call number with the highest priority, and if there is no response, the call is redirected to the call number with a lower priority than the highest priority.

5. The method according to claim 1, wherein the gateway determines the number of the terminal initiating the incoming call, and the redirection of the incoming call is initiated if the number of the terminal initiating the incoming call corresponds to at least one first terminal number.

6. The method according to claim 5, wherein the gateway transmits the identifier of the terminal present to the at least one call redirection server, with a number of the terminal initiating the incoming call, for putting the terminal initiating the incoming call in communication with the call number, wherein the gateway stores in memory the first terminal number and transmits the identifier of the terminal present to the call redirection server if the number of the terminal initiating the incoming call corresponds to the first terminal number.

7. The method according to claim 1, wherein the gateway determines at least one prefix of the number of the terminal initiating the incoming call, and the redirection of the incoming call is initiated if the prefix corresponds to at least one first prefix.

8. A non-transitory computer storage medium storing code instructions of a computer program for implementing the method according to claim 1, when the computer program is executed by a processor.

9. A gateway configured for the implementation of the method according to claim 1.

10. A gateway according to claim 9, configured to manage a wireless local network and to determine the identifier or identifiers of terminals present in the local network, the gateway also being configured to transmit the identifier of the terminal present to at least one call redirection server, with a number of the terminal initiating the incoming call, for putting the terminal initiating the incoming call in communication with a call number associated with the terminal present in the local network.

11. A call redirection server, configured to implement the method according to claim 3 and to:

receive from the gateway the number of the terminal initiating the incoming call as well as the identifier of the terminal present in the local network, determine a call number associated with a terminal present from the identifier of this terminal present, and put the terminal initiating the incoming call in communication with the call number.

12. The method according to claim 1, wherein the identifier of the terminal is a MAC address of the terminal in the local network.

13. The method according to claim 1, wherein the incoming call is prevented from being directed to the telephone number associated with a gateway.

* * * * *